(12) United States Patent
Vihtari

(10) Patent No.: US 8,788,677 B2
(45) Date of Patent: Jul. 22, 2014

(54) SESSION BASED SUPPORT OF MULTIPLE 3GPP STANDARDS VERSIONS

(75) Inventor: Mike Vihtari, Kanata (CA)

(73) Assignee: Alcatel Lucent, Boulogne Billancourt (FR)

( * ) Notice: Subject to any disclaimer, the term of this patent is extended or adjusted under 35 U.S.C. 154(b) by 680 days.

(21) Appl. No.: 13/024,886

(22) Filed: Feb. 10, 2011

(65) Prior Publication Data
US 2012/0210006 A1    Aug. 16, 2012

(51) Int. Cl.
*G06F 15/16* (2006.01)
*H04W 76/00* (2009.01)

(52) U.S. Cl.
USPC .......................................... 709/227; 370/328

(58) Field of Classification Search
USPC .......................................................... 709/227
See application file for complete search history.

(56) References Cited

U.S. PATENT DOCUMENTS

| | | | |
|---|---|---|---|
| 2007/0259651 A1* | 11/2007 | Bae et al. | 455/412.1 |
| 2008/0271113 A1* | 10/2008 | Belling | 726/1 |
| 2010/0154029 A1* | 6/2010 | Fernandez et al. | 726/1 |
| 2011/0161504 A1* | 6/2011 | Zhou et al. | 709/227 |
| 2011/0211465 A1* | 9/2011 | Farrugia et al. | 370/252 |
| 2012/0158994 A1* | 6/2012 | McNamee et al. | 709/238 |

OTHER PUBLICATIONS

"3GPP TS 29.229", Jun. 2010, V9.2.0, p. 24.*
"3GPP TS 29.213", Jun. 2010, V8.8.0, pp. 9-11.*

* cited by examiner

*Primary Examiner* — Kevin Bates
*Assistant Examiner* — Nazia Naoreen
(74) *Attorney, Agent, or Firm* — Kramer Amado, P.C.

(57) ABSTRACT

Embodiments are disclosed that enable a device such as a policy and charging rules function (PCRF) node to operate with other nodes in a long term evolution (LTE) network that are operating at different respective major-minor release combinations of the $3^{rd}$ Generation Partnership Project (3GPP) standards. Some embodiments enable such a device to operate with another network node at a given major-minor release combination of the 3GPP standards with respect to one session being managed by the device and at another major-minor release combination of the 3GPP standards with respect to another session. Some embodiments enable the major-minor release combination to be specified by first and second attribute value pairs (AVPs) respectively indicating the major and minor release identifiers of the major-minor release combination when a new session is requested, thereby providing greater flexibility for establishing sessions.

27 Claims, 17 Drawing Sheets

SESSION BASED SUPPORT OF MULTIPLE 3GPP STANDARDS VERSIONS

CROSS REFERENCE TO RELATED APPLICATIONS

This United States non-provisional patent application does not claim priority to any United States provisional patent application or any foreign patent application.

FIELD OF THE DISCLOSURE

The disclosures made herein relate generally to the telecommunications industry. The invention discussed herein is in the general classification of a device capable of operation in a mode compatible with different versions of the 3GPP standards and a method for operating according to different versions of the 3GPP standards at the PCRF node.

BACKGROUND

This section introduces aspects that may be helpful in facilitating a better understanding of the invention. Accordingly, the statements of this section are to be read in this light and are not to be understood as admissions about what is in the prior art or what is not in the prior art.

Several technical terms and/or phrases will be used throughout this application and merit a brief explanation.

The $3^{rd}$ Generation Partnership Project (3GPP) attempts to create a uniform third-generation mobile phone system. 3GPP standards are called releases and different functionality is present in the different versions of the releases.

The 3GPP standards continue to evolve and the major releases of the standards can be differentiated using supported features. However, there also may be differences between minor versions of the 3GPP standards that render them incompatible with each other. It is required that a single release of the Policy and Charging Rules Function (PCRF) be used with different networks operating with different minor versions of the standards.

A base transceiver station (BTS or BS) is used between a mobile phone and a network to permit wireless communication. It can be a radio base station (RBS), node B for 3G networks or enhanced node B for long term evolution (LTE) networks.

A global system for mobile communications (GSM) network includes a network and switching subsystem (NSS) with a mobile switching center (MSC) and associated registers (e.g. home location register (HLR) and visitor location register (VLR)), a base station controller (BSC) and multiple BTSs and an operations support system (OSS).

The GSM originally only involved a circuit switched network for voice calls and short messaging services (SMS). However, it was extended to include packet-switched data services via the General Packet Radio Service (GPRS) core network to permit Internet access.

A MSC is the service delivery node for GSM in charge of routing voice calls. The gateway MSC (GMSC) is an MSC that ascertains the location of a subscriber who is being called by checking the HLR. The gateway MSC also interfaces with the Public Switched Telephone Network (PSTN).

The HER is a central database containing mobile phone subscriber information. A VLR is a temporary database containing information related to mobile phone subscribers that are roaming in an area the VLR serves. Each BTS is served by a VLR.

A gateway GPRS Support Node (GGSN) permits interaction between the GPRS network which is used for transmitting Internet Protocol (IP) packets and external packet switched networks. When a GGSN receives data addressed to a user, it is forwarded to the serving GPRS support node (SGSN) for delivery to the mobile stations in its service area.

System architecture evolution (SAE) is the architecture of 3GPP's LTE wireless communication standard. The evolved packet core (EPC) is the equivalent of GPRS networks and includes a mobile management entity (MME), a serving gateway (SGW), a Public Data Network (PDN) gateway (POW or PDN GW), and a policy and charging rules function (PCRF) node.

The MME is the control node for the LTE network. It tracks mobile devices and selects the SGW for a mobile device. The SGW sends data packets while the PGW permits the mobile phone to connect to external data networks. The PCRF node is a concatenation of Policy Decision Function (PDF) and Charging Rules Function (CRF).

Currently, all components in a network implement the same or compatible minor versions of the 3GPP standards. New product releases are required to implement the supported 3GPP standards version of the network. However, it is not always possible during trials of product releases (i.e. live deployments) to change product releases. It is also a maintenance issue to have multiple versions of a product for the multiple minor versions of the 3GPP standards. There is no means to distinguish between minor versions of the 3GPP standards and/or determine which minor version is being used in a network component.

Hence, there is a need for a device that efficiently, reliably and affordably permits operation in a mode compatible with different versions of the 3GPP standards and a methodology that permits determination and selection of different versions of the 3GPP standards at the PCRF node.

SUMMARY OF THE DISCLOSURE

Some embodiments of the invention enable a device such as a PCRF node to operate with other nodes in an LTE network that are operating at different respective major and minor (hereinafter major-minor) release combinations of the 3GPP standards.

Some embodiments of the invention enable a device such as a PCRF node to operate with another node in an LTE network at a given major-minor release combination of the 3GPP standards with respect to an existing subscriber session (hereinafter referred to simply as a session) and at another major-minor release combination of the 3GPP standards when a new session is established by the device, wherein the major-minor release combination is specified by the node with a request to establish the new session.

According to an aspect of the invention a device for controlling sessions in a network is provided. The device comprises an interface for communicating with an entity operable to send and receive messages regarding a session; data storage adapted to store session data related to the session and to store configuration data corresponding to the entity; and a controller operable to determine, from first and second attribute value pairs (AVPs) of a message received from the entity requesting establishment of a new session, a major-minor release combination under which the new session is to be established, and to determine, from the session data, a major-minor release combination of an existing session responsive to receiving, from the entity, a message regarding the existing session.

Advantageously, by enabling new sessions to be created under various respective major-minor release combinations of the 3GPP standards, each such combination being specified with a request for establishing a corresponding new session, some embodiments of the invention provide session based support of multiple 3GPP standard versions. Enabling new sessions to be established at various major-minor release combination supported by peer nodes in an LTE network provides more support for legacy systems and applications as the LTE network evolves and as the peer nodes therein are upgraded through various 3GPP standard versions.

In some embodiments the controller is further operable to determine from the configuration data, responsive to not receiving the second AVP, the major-minor release combination under which the new session is to be established.

In some embodiments the data storage is further adapted to store network configuration data, and the controller is further operable to determine from the network configuration data, in the absence of configuration data corresponding to the entity, the major-minor release combination under which the new session is to be established.

According to another aspect of the invention a method of controlling sessions performed by a device is provided. The method includes the steps of: receiving a first AVP in a session request from a node; determining if there is an established session corresponding to the session request; and performing the following steps responsive to there not being an established session: determining a major release identifier associated with the first AVP; determining if a second AVP was received in the session request; determining, responsive to receiving the second AVP, a minor release identifier associated with the second AVP; and establishing a session corresponding to the major and minor release identifiers.

In some embodiments the method includes responsive to there not being an established session: determining, responsive to not receiving the second AVP, the minor release identifier from configuration data. Determining the minor release identifier from configuration data in some embodiments may include: determining if there is an entry of peer configuration data corresponding to the node and the major release identifier; retrieving, responsive to there being said entry, a minor release identifier from said entry; and retrieving, responsive to there not being said entry, a minor release identifier from an entry of network configuration data.

In some embodiments of the method, determining the minor release identifier associated with the second AVP may include determining the minor release identifier from a vendor identifier, a feature identifier, and a feature list included in the second AVP.

According to yet another aspect of the invention a network device is provided for servicing session requirements of an end-user device. The network device includes: an interface for communicating with a network node operable to send and receive messages regarding a session; data storage adapted to store session data related to the session; and a controller operable to determine that a new session is required for the end-user device, determine a major-minor release combination under which the new session is to be established, generate a session request including first and second AVPs indicating respectively a major and minor release corresponding to the major-minor release combination, and send the session request to the network node.

In some embodiments of the network device the controller may be further operable to determine that an update to an existing session is required, determine a major-minor release combination of the existing session, generate a session update request specifying a major release corresponding to the major-minor release combination of the existing session, and send the session update request to the network node.

According to still another aspect of the invention a method to be performed by a first network device is provided. The method is a method of servicing session requirements of an end-user device. The method comprises determining if a new session is required for the end-user device, and performing the following steps responsive to the new session being required: determining a major-minor release combination under which the new session is to be established; generating a first AVP for the new session that indicates a major release corresponding to the major-minor release combination; generating a second AVP for the new session that indicates a minor release corresponding to the major-minor release combination; and sending a session request that includes the first and second AVPs to the second network device.

In some embodiments of the method of servicing a session requirement the method may further include responsive to the new session not being required: determining that an update to an existing session is required; determining a major-minor release combination of the existing session; generating a session update request specifying a major release corresponding to the major-minor release combination of the existing session; and sending the session update request to the second network device.

Some embodiments of the methodology may involve supporting multiple minor versions of the 3GPP standards at the PCRF node; determining which minor version of the 3GPP standards is used by a component in a network; selecting the minor version of the 3GPP standards supported by the component in the network; and utilizing the minor version of the 3GPP standards supported by the component in the network for sending content and messaging from the PCRF node.

Some embodiments of the device (e.g. PCRF node) include a memory containing instructions processed by a processor. The instructions may include instructions for operating internally at the PCRF node at a highest supported minor version of the 3GPP standards; sending internal messaging and processing data at the PCRF node according to the highest supported minor version of the 3GPP standards; supporting multiple minor versions of the 3GPP standards at the PCRF node; determining which minor version of the 3GPP standards is used by a component in a network; selecting the minor version of the 3GPP standards supported by the component in the network; and utilizing the minor version of the 3GPP standards supported by the component in the network for sending content and messaging from the PCRF node.

Under some applications, embodiments may provide a reliable device and method that permit selection of different minor versions of the 3GPP standards for operation at the PCRF node.

BRIEF DESCRIPTION OF THE DRAWINGS

Some embodiments of apparatus and/or methods of the present invention are now described, by way of example only, and with reference to the accompanying drawings, in which.

DETAILED DESCRIPTION OF THE DRAWINGS

The evolved packet core (EPC) is an all-IP mobile core for the long term evolved (LIE) network that involves a converged framework for packet-based real-time and non-real-time services. The EPC is specified by 3GPP Release 8 that was finalized in the first quarter of 2009.

Figure 1:
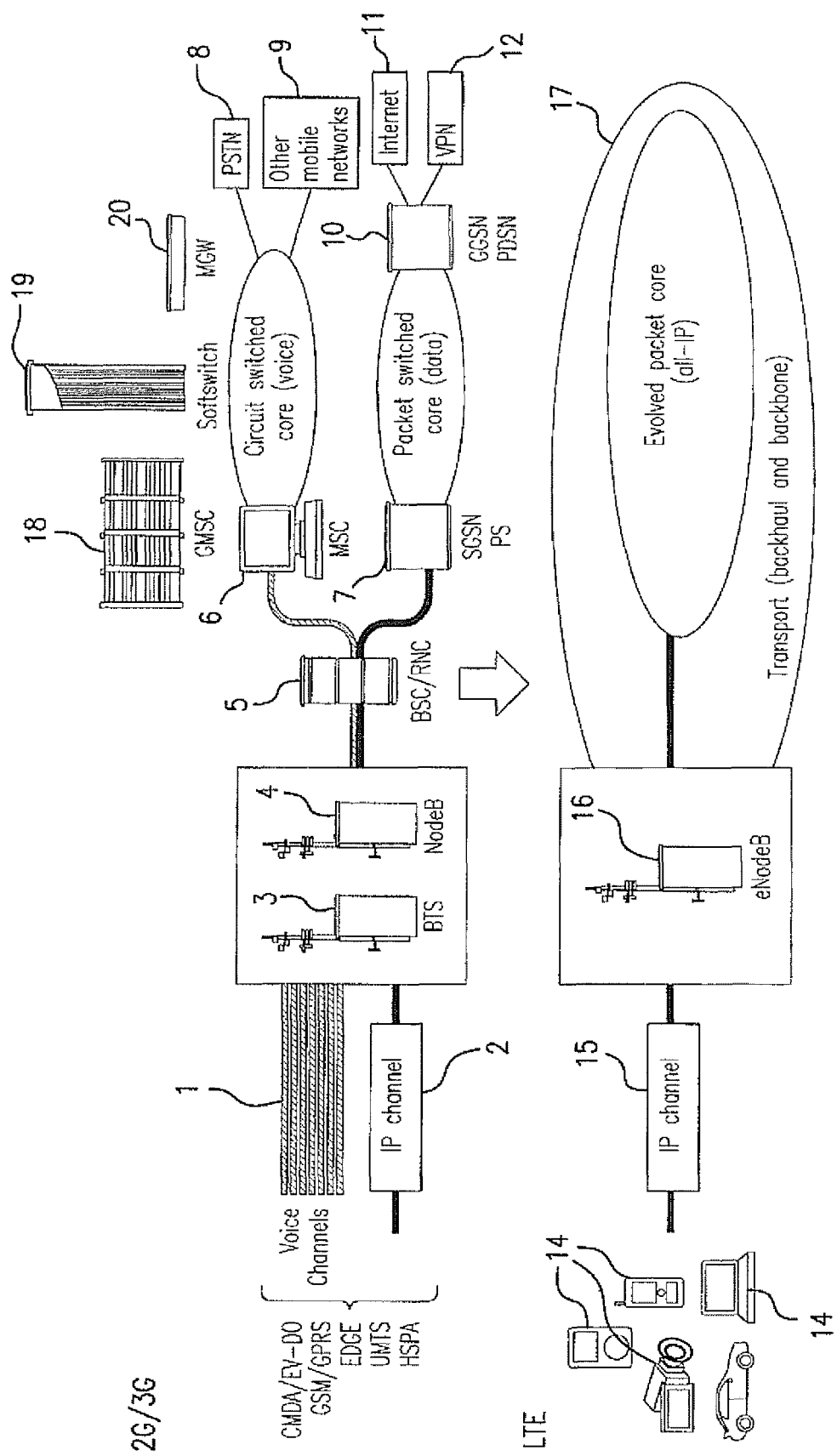
FIG. 1 depicts a 2G/3G mobile generation network and a LTE network.

The EPC provides mobile core functionality that in previous mobile generations (e.g. 2G and 3G) has been realized through two separate sub-domains: circuit-switched (CS) for voice and packet-switched (PS) for data. As shown in FIG. 1, in previous mobile generations (e.g. 2G and 3G), both voice channels 1 and IP channels 2 are utilized to connect with a BTS 3 or NodeB 4. This permits transmission to a BSC or RNC 5 connected to a MSC 6 or SGSN 7. The RNC controls the NodeBs that are connected to it and connects to the circuit switched core network through a media gateway (MGW) 20 and MSC 6 and to the SGSN 7 in the packet switched core network. The MSC 6 permits circuit switched traffic to travel to the PSTN 8 or other mobile networks 9. The SGSN 7 permits packet switched traffic to travel to a GGSN 10 and onto the Internet 11 or a Virtual Private Network (VPN) 12. The VPN 12 is an overlay network that permits private data to be sent securely over the Internet. A GMSC 18 responsible for determining which MSC a call recipient is visiting and a softswitch 19 responsible for connecting telephone calls from one phone line to another are also depicted in FIG. 1.

As shown in FIG. 1, in a LTE network, these two distinct mobile core sub-domains used for separate processing and switching of mobile voice and data are unified as a single IP domain (IP channel 15). LTE is an end-to-end all-IP network from mobile handsets and other terminal devices 14 with embedded IP capabilities over IP-based Evolved NodeBs (eNodeBs) 16 (i.e. LIE base stations) and across the EPC 17 and throughout the application domain (both IP Multimedia Subsystem (IMS) and non-IMS).

EPC 17 is essential for end-to-end IP service delivery across the LTE network. The EPC 17 is also instrumental in allowing the introduction of new business models, such as partnering/revenue sharing with third-party content and application providers. EPC 17 promotes the introduction of new innovative services and the enablement of new applications.

EPC 17 addresses LTE requirements to provide advanced real-time and media-rich services with enhanced Quality of Experience (QoE). EPC 17 improves network performance by the separation of control and data planes and through a flattened IP architecture that reduces the hierarchy between mobile data elements (e.g. data connections from eNodeB 16 only traverse through EPC gateways).

Figure 2:
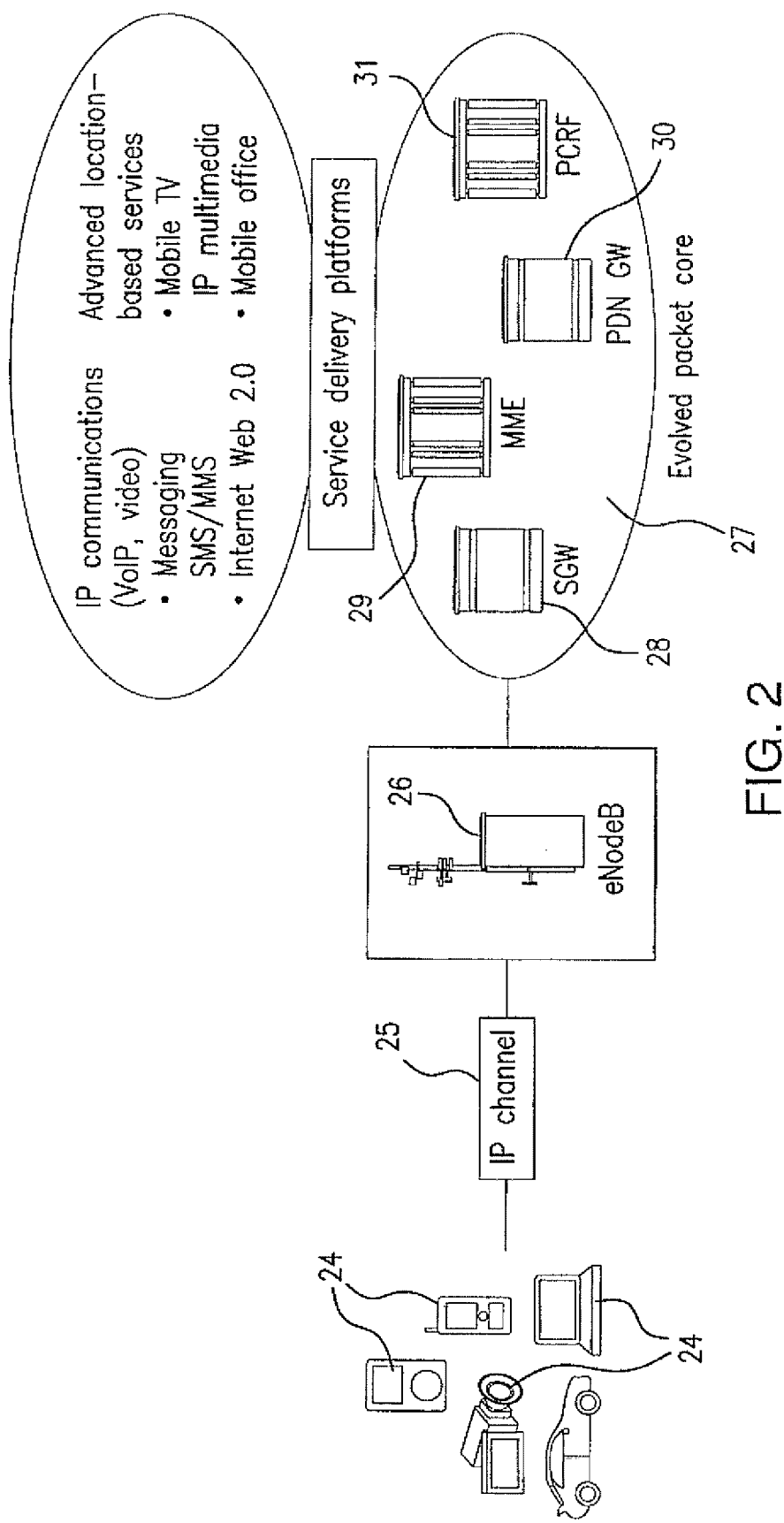
FIG. 2 depicts a LTE network and the components of the EPC.

FIG. 2 depicts a LTE network with the components of the EPC. FIG. 2 shows the EPC 27 as a core part of the all-IP environment of the LTE network. In the LTE network, the two distinct mobile core sub-domains used for separate processing and switching of mobile voice and data in 2G/3G networks are unified as a single IP domain (IP channel 25). The LTE network is an end-to-end all-IP network from mobile handsets and other terminal devices 24 with embedded IP capabilities over IP-based Evolved NodeBs 26 and across the EPC 27.

The introduction of the EPC 27 and all-IP network architecture in the mobile network has profound implications on mobile services, as all voice, data and video communications are built on the IP protocol. EPC 27 also permits interworking of the new mobile architecture with previous mobile generations (e.g. 2G or 3G) and the scalability required by each of the core elements to address dynamic terminal mobility and dramatic increases in bandwidth and the number of direct connections to user terminals. The EPC 27 also increases the reliability and availability delivered by each element to insure service continuity.

To address a radically different set of network and service requirements, the EPC 27 must represent a departure from existing mobile networking paradigms. Introduction of EPC 27 with the LTE network in many ways represents a radical departure from previous mobile paradigms. It signals the end of circuit-switched voice. The LTE network uses a new paradigm for voice traffic called Voice-over-IP (VoIP). This ends a period of more than twenty (20) years during which one application dictated the whole network architecture. EPC 27 treats voice as just one of many IP-based network applications, albeit an important one that requires superb packet network performance and one that is responsible for significant operator revenues.

The LIE network must match and exceed the QoE of wireline broadband. This is quite different from providing best-effort and low-speed web browsing or Short Message Service (SMS) which are two data applications for which the existing PS mobile cores are optimized.

In the LTE network, all mobility management is moved into the mobile core and becomes the responsibility of the MME 29. This is a consequence of the split of functions previously performed by the RNC/BSC and NodeB/BTS. The MME 29 requires a control plane capacity that is an order of magnitude larger than the SGSN or PDSN and must insure interworking with 2G/3G legacy mobile systems.

The LTE network must provide superior end-to-end Quality-of-Service (QoS) management and enforcement in order to deliver new media-rich, low-latency and real-time services. There is an expected move from four classes of service (CoS) available in 3G to nine QoS profiles with strict performance targets. This must be achieved while ensuring scalability of users, services and data sessions. In addition, although not a part of the 3GPP Release 8 specification set, deep packet inspection (DPI) and other advanced packet processing are required.

In a LTE network, service control is provided via the Policy and Charging Rules Function (PCRF) 31. This is a change from previous mobile systems, where service control was realized primarily through user equipment (UE) authentication by the network. The PCRF 31 dynamically controls and manages all data sessions and provides appropriate interfaces toward charging and billing systems as well as enables new business models.

The LTE network requires significantly more capacity in both the data plane and control plane. The existing 2G/3G mobile core elements cannot fully address LTE requirements without a series of upgrades to the platforms. Most of the existing platforms are ill-suited for high-capacity packet processing. Scaling the packet processing requirements on these platforms results in higher consumption of system capacity, high latency, low performance and dramatic performance/feature tradeoffs. In some cases, performance drops more than fifty percent (50%) when features like charging are enabled. Legacy core platforms must dramatically change their product architectures to handle LTE, and even with these architectural changes, they are only a stop-gap solution that may require complex upgrade scenarios to address LTE scalability and performance requirements.

While LTE introduces a clear delineation of the data (user) plane and a control plane, it also imposes two sets of distinct technical requirements on the data plane and control plane. The data plane needs to address requirements for high bandwidth, high availability and scalability with aggregate throughput (per gateway) easily reaching over 100 Gb/s (100 gigabits per second). At the same time, the data plane needs to allow unaffected wirespeed performance with sophisticated processing of millions of service data flows and data bearers turned on while being able to provide sophisticated, fine-granular (per-application, per-service, per-user) QoS. The control plane needs to address the requirements for high scalability and high availability of secure mobility and connection management along with highly reliable and scalable network-wide policy and subscriber management.

The EPC is realized through four new elements: Serving Gateway (SGW) 28; Packet Data Network (PDN) Gateway (PGW or PDN GW) 30; Mobility Management Entity (MME) 29; and Policy and Charging Rules Function (PCRF) 31.

While SGW 28, PDN GW 30 and MME 29 were introduced iii 3GPP Release 8, PCRF 31 was introduced in 3GPP Release 7. Until recently, the architectures using PCRF 31 have not been widely adopted. The PCRF's interoperation with the EPC gateways and the MME 29 is mandatory in Release 8 and essential for the operation of the LTE.

Figure 3:
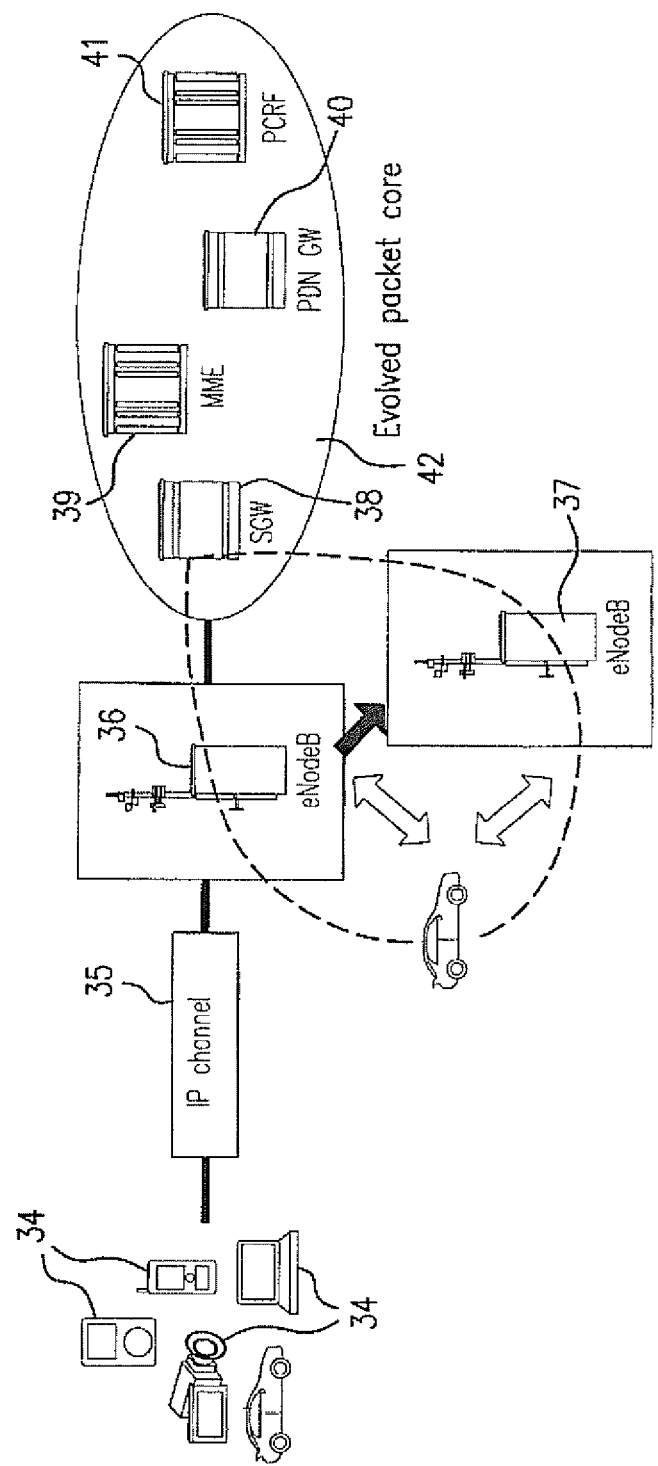
FIG. 3 depicts the SGW of a LTE network handling a mobile device moving from a location serviced by a first eNodeB to a location serviced by a second eNodeB.

FIG. 3 depicts the SGW of a LTE network handling a mobile device moving from a location serviced by a first eNodeB to a location serviced by a second eNodeB. In the LTE network, the two distinct mobile core sub-domains used for separate processing and switching of mobile voice and data in 2G/30 networks are unified as a single IP domain (IP channel 35). LIE is an end-to-end all-IP network from mobile handsets and other terminal devices 34 with embedded IP capabilities over IP-based Evolved NodeBs 36 and 37 and across the EPC 42. The EPC 42 has a SGW 38, a MME 39, a PDN GW 40 and a PCRF 41.

The SGW 38 is a data plane element whose primary function is to manage user-plane mobility and act as a demarcation point between the RAN and core networks. SGW 38 maintains data paths between eNodeBs 36 and 37 and the PDN GW 40. From a functional perspective, the SGW 38 is the termination point of the packet data network interface toward evolved universal terrestrial radio access network (E-UTRAN). When terminals move across areas served by eNodeB elements 36 and 37 in E-UTRAN, the SGW 38 serves as a local mobility anchor. This means that packets are routed through this point for intra E-UTRAN mobility and mobility with other 3GPP technologies such as 2G/GSM and 3G/UMTS.

Like the SGW 38, the Packet Data Network Gateway (PDN GW) 40 is the termination point of the packet data interface toward the packet data network(s). As an anchor point for sessions toward the external packet data networks, the PDN GW 40 supports: policy enforcement features (e.g. applies operator-defined rules for resource allocation and usage); packet filtering (e.g. deep packet inspection for application type detection); and charging (e.g. per-URL charging).

In LTE, data plane traffic is carried over virtual connections called service data flows (SDFs). SDFs, in turn, are carried over bearers (i.e. virtual containers with unique QoS characteristics).

Figure 4:
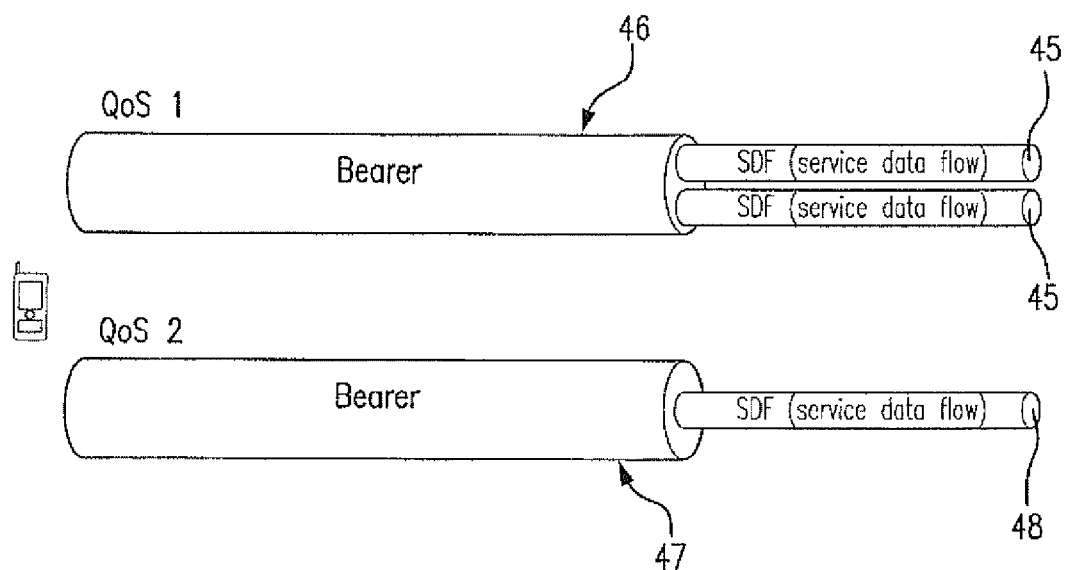
FIG. 4 depicts one or more service data flows (SDFs) aggregated and carried over bearers.

FIG. 4 depicts one or more SDFs aggregated and carried over bearers. Two SDFs 45 are located in bearer 46 and one SDF 48 is located in bearer 47.

Figure 5:
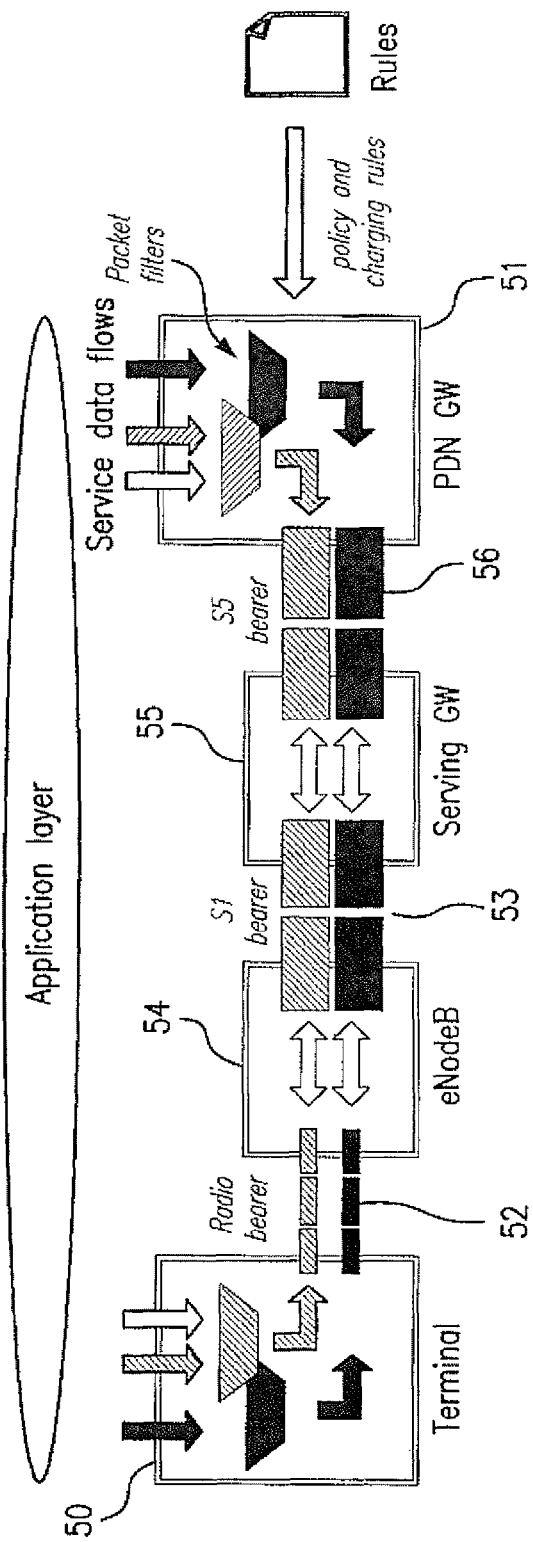
FIG. 5 depicts three segments that constitute an end-to-end bearer.

FIG. 5 depicts three segments that constitute an end-to-end bearer. One bearer, a datapath between a UE (terminal) 50 and a PDN GW 51, has three segments: radio bearer 52 between UE (terminal) 50 and eNodeB 54; data bearer 53 between eNodeB 54 and SGW 55 (SI bearer 53); and data bearer 56 between SGW 55 and PDN GW 51 (S5 bearer 56).

The primary role of the PDN GW 51 is QoS enforcement for each of these SDFs, while SGW 55 focuses on dynamic management of bearers.

As shown in FIG. 3, the Mobility Management Entity (MME) 39 is a nodal element within the EPC 42. MME 39 performs the signaling and control functions to manage the User Equipment (UE)/terminal devices 34 and their access to network connections. The MME 39 also manages the assignment of network resources and the mobility states to support tracking, paging, roaming and handovers. MME 39 controls all control plane functions related to subscriber and session management.

MME 39 manages thousands of eNodeB elements, which is one of the key differences from requirements previously seen in 2G/3G (on RNC/SGSN platforms). The MME 39 is the key element for gateway selection within the EPC 42 (i.e. selection of SGW and PDN GW). The MME 39 also performs signaling and selection of legacy gateways for handovers for other 2G/3G networks. The MME 39 also performs the bearer management control functions to establish the bearer paths that the terminal devices utilize.

The MME 39 supports end-user authentication as well as initiation and negotiation of ciphering and integrity protection algorithms. The MME 39 also handles terminal-to-network sessions by controlling all the signaling procedures used to set up packet data context and negotiate associated parameters like QoS. The MME 39 further is responsible for idle terminal location management by using a tracking area update process to enable the network to join terminals for incoming sessions.

The major improvement provided in Release 7 of the 3GPP standards, in terms of policy and charging, is the definition of a new converged architecture to allow the optimization of interactions between the Policy and Rules functions. Release 7 of the 3GPP standards involves a new network node, Policy and Charging Rules Function (PCRF) node 41, which is a concatenation of Policy Decision Function (PDF) and Charging Rules Function (CRF).

Release 8 further enhances PCRF functionality by widening the scope of the Policy and Charging Control (PCC) framework to facilitate non-3GPP access to the network (e.g. WiFi or fixed IP broadband access). In the generic policy and charging control 3GPP model, the Policy and Charging Enforcement Function (PCEF) is the generic name for the functional entity that supports service data flow detection, policy enforcement and flow-based charging. The Application Function (AF) represents the network element that supports applications that require dynamic policy and/or charging control. In the IMS model, the AF is implemented by the Proxy Call Session Control Function (P-CSCF).

Figure 6:
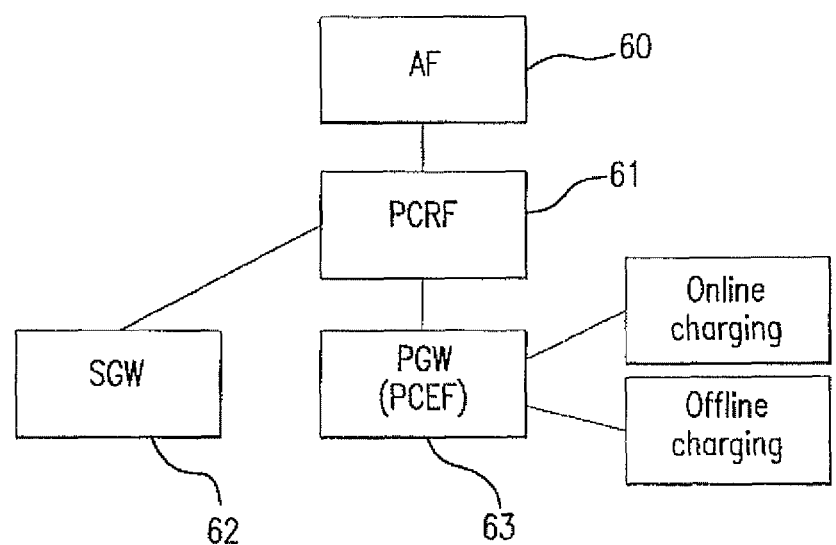
FIG. 6 depicts how the PCRF node interfaces with other EPC elements.

FIG. 6 depicts how the PCRF node interfaces with other EPC elements. The PCRF node 61 connects to the AF element 60, the PGW 63 and the SGW 62.

Figure 7:
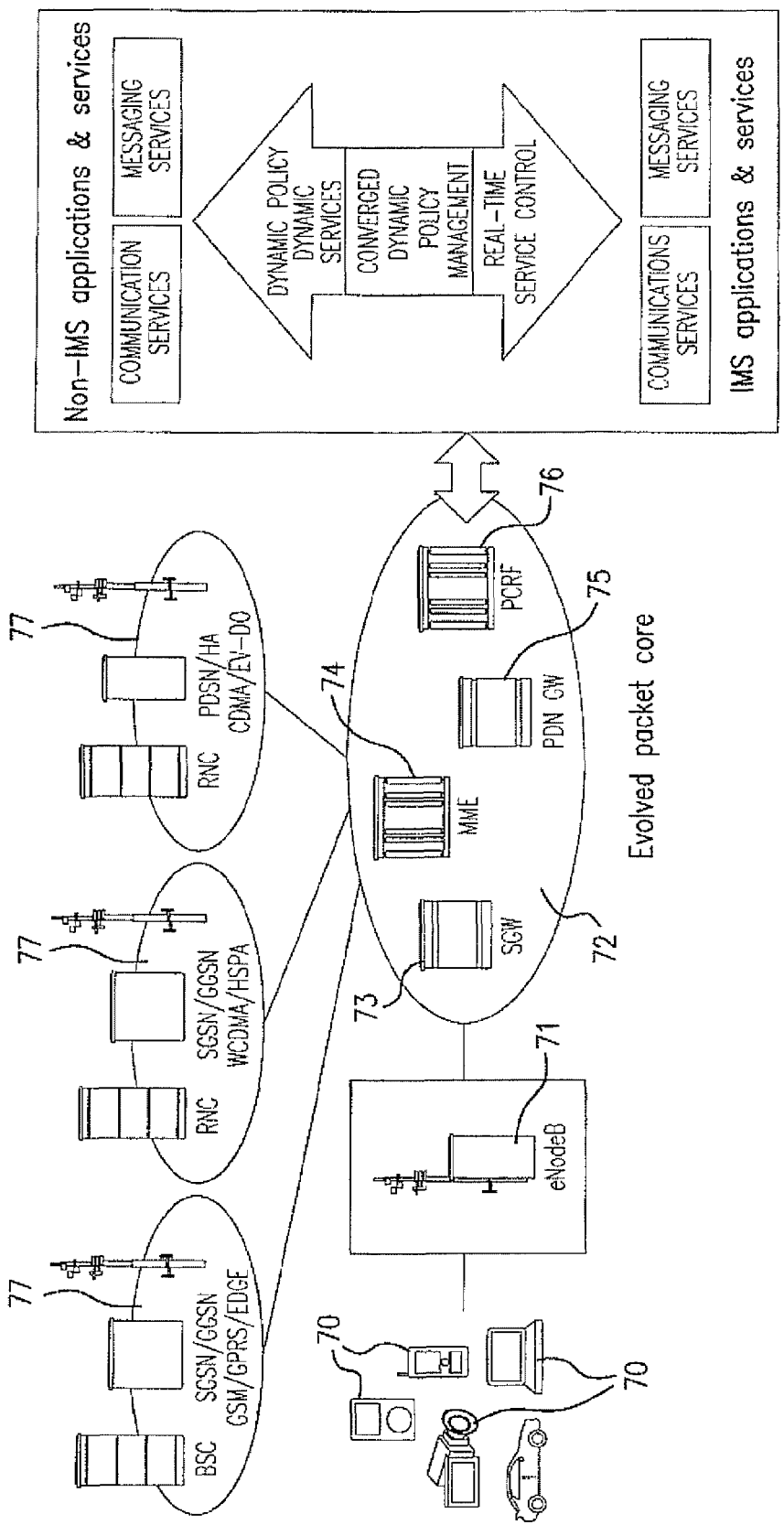
FIG. 7 depicts the dynamic nature of policy and mobility management in a LTE network.

FIG. 7 depicts the dynamic nature of policy and mobility management in a LTE network. The LTE network of FIG. 7 is an end-to-end all-IP network from mobile handsets and other terminal devices 70 with embedded IP capabilities over IP-based Evolved NodeBs 71 and across the EPC 72. The EPC 72 has a SGW 73, a MME 74, a PDN GW 75 and a PCRF 76. The EPC 72 is capable of connecting to a variety of mobile networks 77 and performing dynamic management of mobility, data sessions and network policies.

Figure 8:
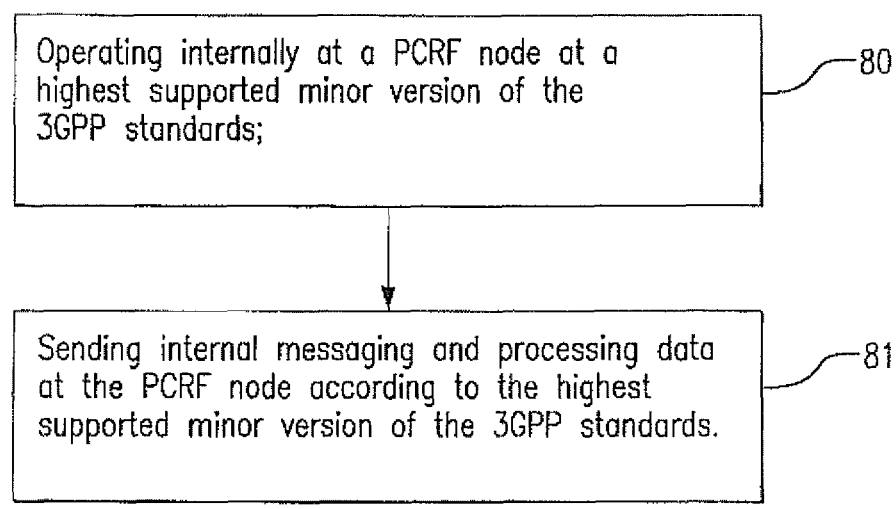
FIG. 8 depicts a method of internal operation at the PCRF node according to a first embodiment of the invention.

FIG. 8 depicts a method of internal operation at the PCRF node according to a first embodiment. The methodology involves operating internally at a PCRF node at a highest supported minor version of the 3GPP standards 80. The highest supported minor version of the 3GPP standards is usually considered the most recent/up-to-date minor version of the 3GPP standards that a given PCRF node supports. Operating internally at a PCRF node at the highest supported minor version of the 3GPP standards may include an operation for sending internal messaging and processing data at the PCRF node according to the highest supported minor version of the 3GPP standards 81.

Figure 9:
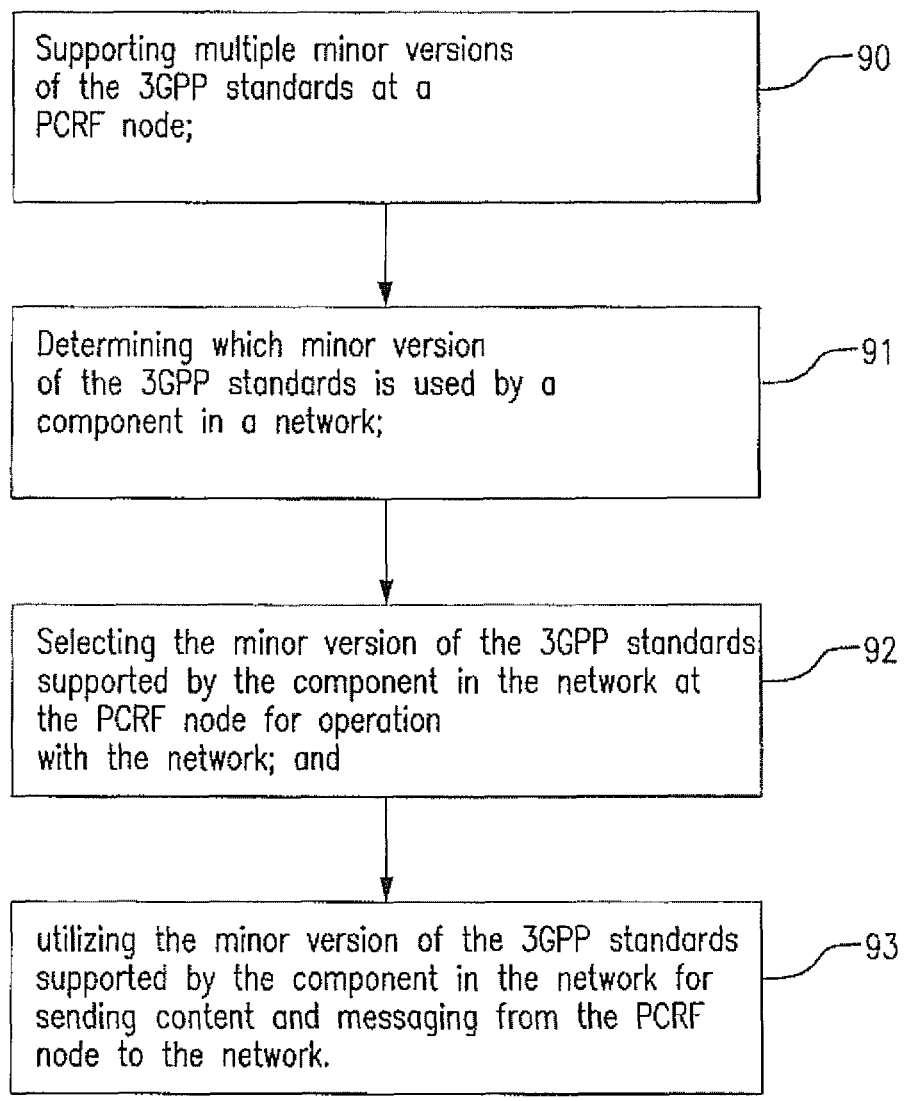
FIG. 9 depicts a method of operation of the interface components of the PCRF node according to a second embodiment of the invention.

FIG. 9 depicts a method of operation of the interface components of a PCRF node according to a second embodiment. An operation for supporting multiple minor versions of the 3GPP standards at the PCRF node 90 is performed. An operation for determining which minor version of the 3GPP standards is used by a component in a network at the PCRF node 91 is performed.

An operation for selecting the minor version of the 3GPP standards supported by the component in the network at the PCRF node for operation with the network 92 is also performed. An operation for utilizing the minor version of the 3GPP standards supported by the component in the network for sending content and messaging from the PCRF node to the network 93 is performed.

Alternatively, an operation for selecting a minor version of the 3GPP standards to be supported by at least one interface component of a PCRF node by a network operator is performed. An operation for operating the at least one interface component at the PCRF node at the minor version of the 3GPP standards selected by the network operator is performed.

Figure 10:
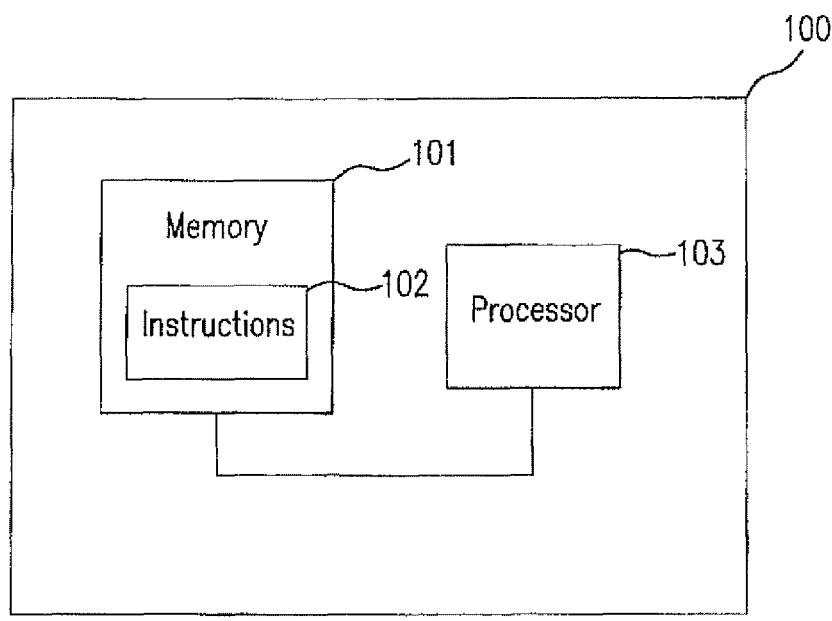
FIG. 10 depicts a device capable of operating according to different minor versions of the 3GPP standards in accordance with a third embodiment of the invention.

FIG. 10 depicts a device in accordance with a third embodiment that is capable of operating according to different minor versions of the 3GPP standards. The device (e.g. PCRF node) 100 includes a memory 101 containing instructions 102 processed by a processor 103. The instructions may include instructions for operating internally at the PCRF node at a highest supported minor version of the 3GPP standards; sending internal messaging and processing data at the PCRF node according to the highest supported minor version of the 3GPP standards; supporting multiple minor versions of the 3GPP standards at the PCRF node; determining which minor version of the 3GPP standards is used by a component in a network; selecting the minor version of the 3GPP standards supported by the component in the network for operation with the network; and utilizing the minor version of the 3GPP standards supported by the component in the network for sending content and messaging from the PCRF node to the network.

Alternatively, the device may contain instructions for selecting a minor version of the 3GPP standards to be supported by at least one interface component of a PCRF node by a network operator and for operating the at least one interface component at the PCRF node at the minor version of the 3GPP standards selected by the network operator.

Figure 11:
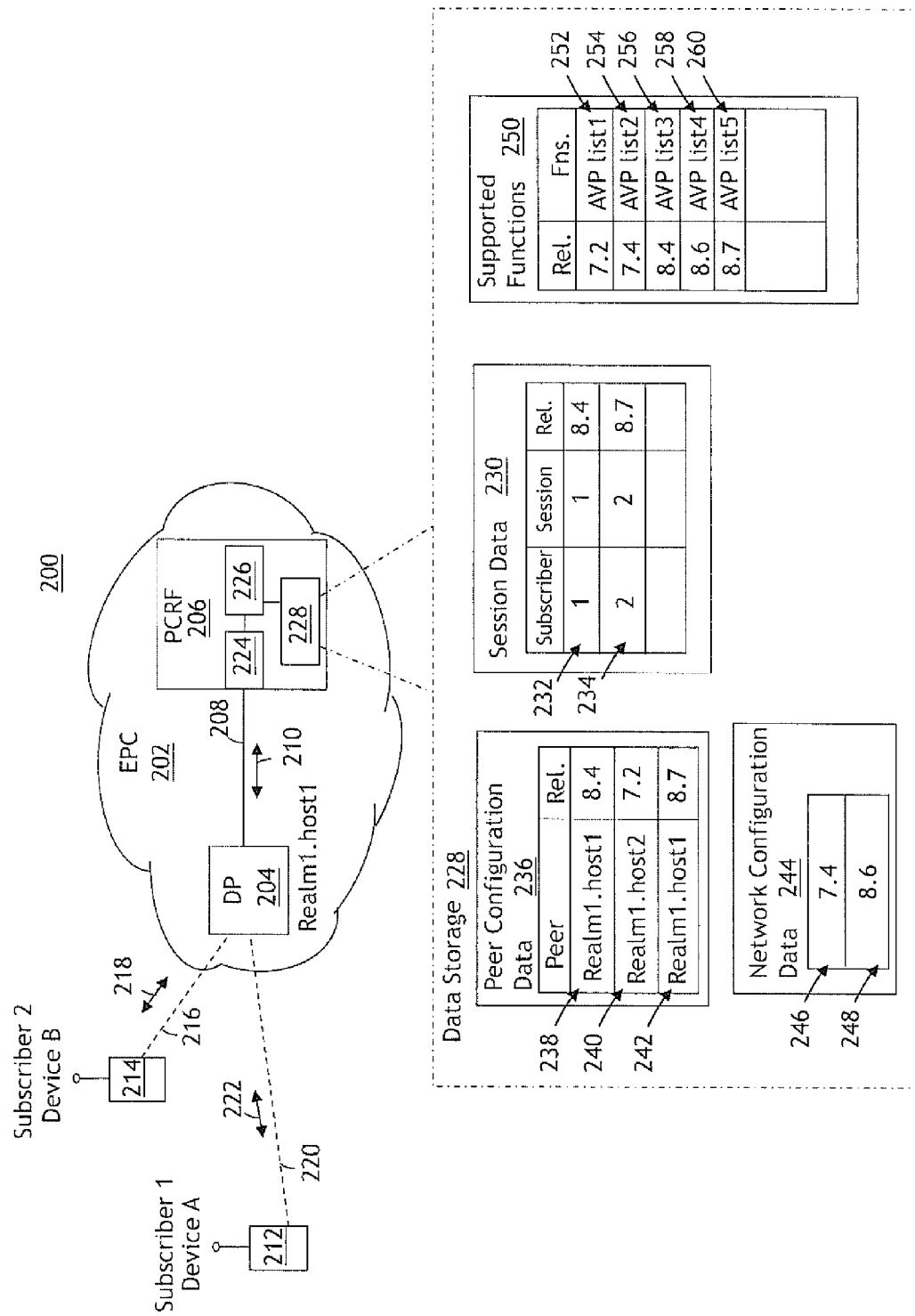
FIG. 11 depicts an alternative implementation of the device of FIG. 10 in accordance with a fourth embodiment of the invention.

FIG. 11 depicts an alternative implementation of the device of FIG. 10 in accordance with a fourth embodiment and in context of an LTE network 200 having an EPC 202. The device is implemented in a PCRF node 206 that communicates Diameter protocol messages 210 with a Diameter Peer (DP) 204 over a link 208. The Diameter Peer 204 is identified by a realm and hostname, for example "Realm1.host1" as shown in the figure, in accordance with the Diameter Protocol. The DP 204 would typically be a SGW 38 or PDN GW 40 as shown in FIG. 3. A first wireless device 212 labeled Device A and associated with a first subscriber, Subscriber 1, communicates 222 with the DP 204 over a link 220, which comprises both wireless and wireline technologies, for example as shown in FIG. 1. Likewise a second wireless device 214 labeled Device B and associated with a second subscriber, Subscriber 2, communicates 218 with the DP 204 over a link 216, which also comprises both wireless and wireline technologies.

The PCRF node 206 includes a Gx interface 224 coupled to the link 208 for communicating the Diameter Protocol messages 210 with the DP 204. Additional Rx and Gxx interfaces as defined by the 3GPP standards may also be additionally or alternatively included. The interface is coupled to a controller 226, which comprises the memory 101 and the processor 103 shown in FIG. 10. The controller 226 is coupled to data storage 228 adapted to store, and that in operation stores, peer configuration data 236, session data 230, network configuration data 244, and an indication of supported functions 250. The controller 226 is operable to perform steps in accordance with an embodiment that will be described later with reference to FIG. 14. The controller 226 is adapted to be operable as such by programming the memory 101 with the instructions 102.

The peer configuration data 236 includes entries 238, 240, 242 for Diameter Peers and the major-minor release combination under which each was operating at the time the entry was made. For example, a first entry 238 associates the DP 204 by its realm and hostname, Realm1.host1, with a first major-minor release combination shown in the format "major release.minor release", which in this case is "8.4". A second entry 240 associates another Diameter Peer (not shown) having a realm and hostname of "Realm1.host2" with a major-minor release combination of "7.2". A third entry 242, which is a later entry then the first entry 238, associates the DP 204 by its realm and hostname of "Realm 1.host1" with a major-minor release combination of "8.7".

The network configuration data 244 includes default network-wide entries 246, 248 of major-minor release combinations for Diameter Peers. For example, a first default entry 246 indicates a network-wide major-minor release combination of "7.4", which is in the same "major.minor" format of the peer configuration data previously described. A second default entry 248, which was entered later than the first default entry 246, indicates a network-wide major-minor release combination of "8.6". The default network-wide major-minor release combination is used when a Diameter Peer does not have an entry in the peer configuration data 236 for a given major release. As will be described later, the major release may be indicated in a Diameter protocol message 210 received by the PCRF node 206.

The session data 230 includes session entries 232, 234 that each associate a subscriber identifier and a session identifier with a major-minor release combination identifier. For example, a first session entry 232 associates the first subscriber, Subscriber 1 identified by a "1" in the entry 232, and a corresponding session, identified by a "1" in the entry 232, with a major-minor release combination "8.4", which is in the same "major.minor" format previously described. A second session entry 234 associates the second subscriber, Subscriber 2 identified by a "2" in the entry 234, and a corresponding session, identified by a "2" in the entry 234, with a major-minor release combination "8.7". As will be described later, the session data 230 may be used when the PCRF node 206 receives in a Diameter protocol message 210 regarding an existing session.

The indication of supported functions 250 includes entries 252, 254, 256, 258, and 260, each that associate a given major-minor release combination with functions supported according to that major-minor release combination. The functions are specified as a list of attribute value pairs (AVPs). The particular AVPs included in a given list are in accordance with those specified by the 3GPP standards for the corresponding major-minor release combination. As will be described later, the indication of supported functions 250 may be used to validate a Diameter protocol message 210 received by the PCRF node 206 in dependence upon a major-minor release combination determined for a Diameter peer that sent the message or an established session to which the message 210 relates.

Figure 12:
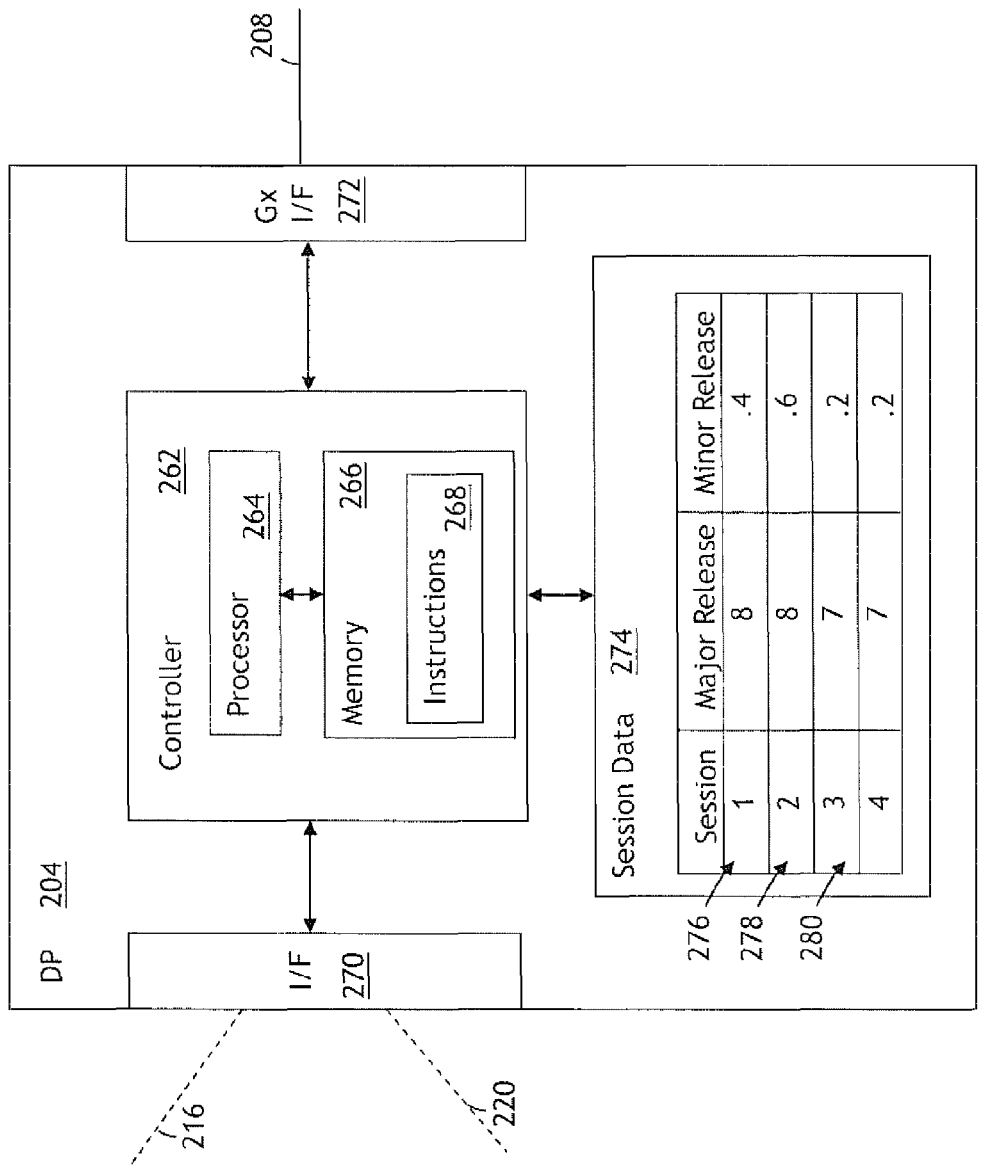
FIG. 12 depicts an EPC node capable of operating according to different major and minor versions of the 3GPP standards in accordance with a fifth embodiment of the invention.

FIG. 12 depicts an EPC node capable of operating according to different major-minor release combinations of versions of the 3GPP standards in accordance with a fifth embodiment. In this case the EPC node is represented by the DP 204, as previously described. The DP 204 includes a controller 262 that comprises a processor 264 that is in communication with a memory 266 programmed with instructions 268. The controller 262 is operable to perform steps in accordance with an embodiment that will be described later with reference to FIG. 17. The controller 262 is adapted to be operable as such by programming the memory 266 with the instructions 268. The DP 204 further includes an interface 270 for coupling to the links 216, 220 for communicating with the subscriber devices, Device A and Device B, as previously described. The DP 204 also has an interface, referred to as a Gx interface, for communicating Diameter protocol messages with the PCRF node 206, or other nodes using the Diameter protocol, over the link 208 as previously described. The DP 204 includes session data 274 that is configured to store, and which in operation stores, information indicating a major-minor release combination under which a given session is operating. For example, a first entry 276 for a first session indicated with a "1", is associated in this manner to a major release "8" and a minor release "0.4", which is a major-minor release combination of "8.4". Likewise a second entry 278 associates a second session "2" with a major-minor release "8.6"; and a third entry 280 associates a third session "3" with a major-minor release "7.2".

Figure 13:
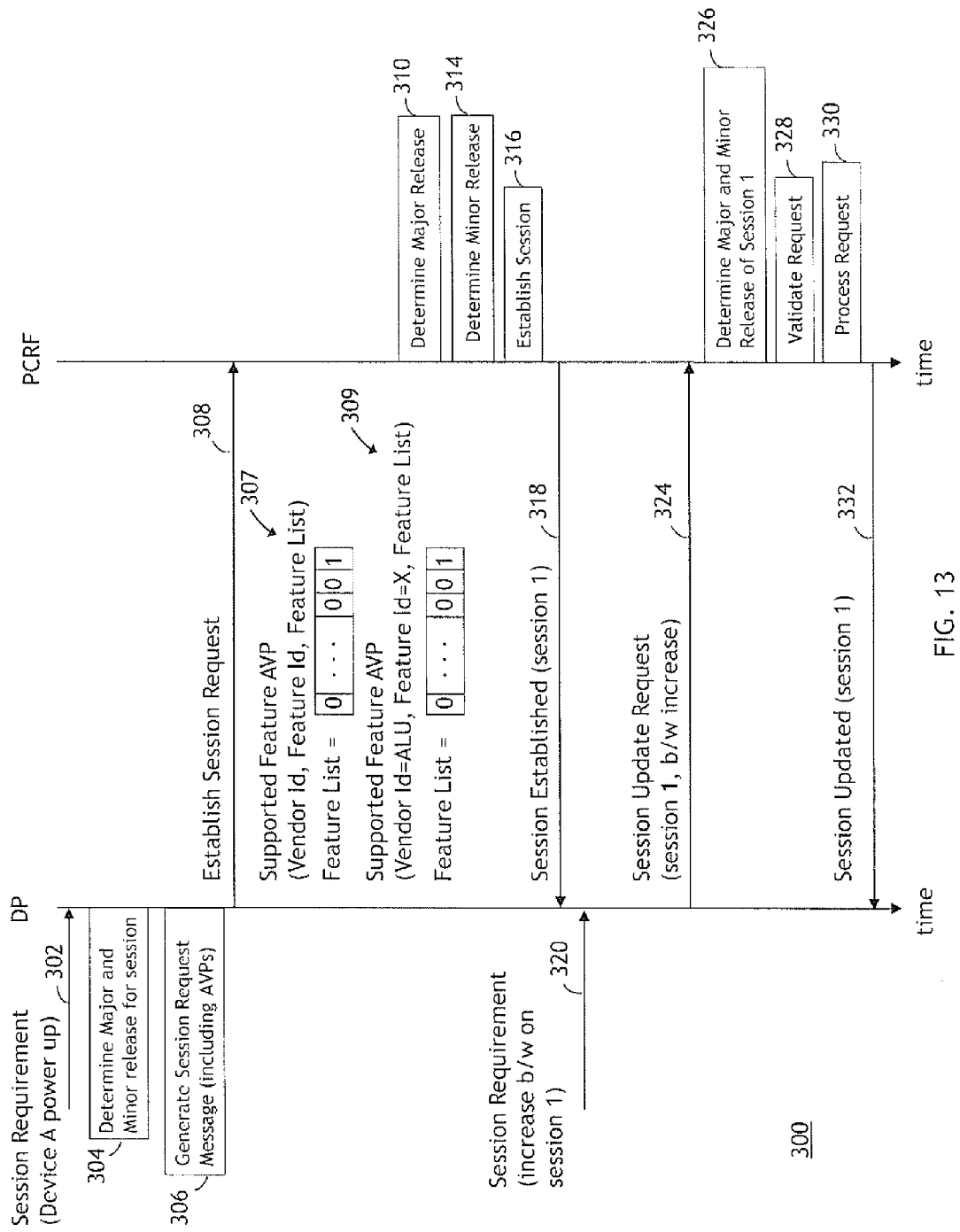
FIG. 13 depicts operation of the PCRF node and messaging between the PCRF node and an EPC node in accordance with a sixth embodiment of the invention.

FIG. 13 depicts operation of the PCRF node 206 and an EPC node, and the messaging between them in accordance with a sixth embodiment. In this case the EPC node is represented by the DP 204, as previously described. The origination and termination of messages at the DP 204 and PCRF node 206, and the respective operations, are depicted along two vertical lines labeled DP and PCRF with time advancing from top to bottom of the figure. Reference to FIG. 11 is made in the following description.

The scenario starts when the DP 204 receives an indication 302 of a session requirement, for example that Device A has powered up and requires a new session to be established. The DP 204 then determines 304 a major-minor release combination under which the new session should be established. The DP 204 then generates 306 a first supported feature AVP 307 which the DP 204 includes in a first request message 308 to be sent to the PCRF 206 to establish the new session for the Device A. The first AVP 307 is in accordance with Diameter protocol messaging and as defined by the 3GPP standards, particularly the Gx interface, and is referred to herein as simply an AVP. The first AVP 307 includes a vendor identifier, a feature identifier and a feature list. The feature list, as defined by the 3GPP standards, includes an indication of a major release of the 3GPP standard under which the session is to be established, the indication taking the form of a binary word having certain bits set in a predefined manner to indicate the major release. In this case bit 0 of the word is set, which indicates major release 8 is to be used for the session.

The DP 204 also generates 306 a second supported feature AVP 309 which the DP 204 also includes in the first request message 308 to be sent to the PCRF 206 with respect to establishing the new session for the Device A. The format of the second AVP 309 is similar to that of the first AVP 307; however the content is different, particularly with respect to the feature identifier and the feature list. In the second AVP 309, the feature identifier has a vendor-specific value, e.g. "X" which is reserved for use by a given vendor as identified by the vendor identifier, e.g. "ALU". The value of the feature identifier in the second AVP 309 means that the feature list of the second AVP 309 includes an indication specifying a minor release under which the new session is to be established. This indication in the feature list takes the form of a binary word having certain bits set in a predefined manner as defined by the vendor to indicate the minor release. In this case bit 0 of the word is set, which indicates minor release "0.4" is to be used for the session. The DP 204 then sends the first request message 308 to the PCRF node 206.

Upon receiving the first request message 308 the PCRF 206 initiates a step to determine 310 the major release under which the new session should be established, which can be done for example by reading the feature list of the first AVP 307 to detect which bits are set and matching the result to one of the predefined settings defined by the 3GPP standards. The PCRF 206 then initiates a step to determine 314 the minor release under which the new session is to be established, which can be done for example by reading the feature list of the second AVP 309 to detect which bits are set and matching the result to one of the predefined settings defined by the vendor specified by the vendor identifier.

Subsequent to successfully making the determinations 310 and 314 of the major and minor releases, and thereby the major-minor release combination under which the requested session is to be established, e.g. release combination "8.4", the PCRF 206 initiates a step to establish 316 the requested session. Upon successful establishment of the session, the PCRF 206 sends a response message 318 to the DP 204 confirming that the session has been established and providing an identifier for the session, e.g. session 1. The session identifier, subscriber identifier, and major-minor release combination are written into the first entry 232 of the session data 230.

At some future time the DP 204 receives another indication 320 of a session requirement corresponding to the Device A in which the first subscriber, subscriber 1, requests an increase in allowed bandwidth on the session 1. This request is but one of many different types of requests that could be made relating to an existing session. Subsequent to receiving the indication 320, the DP 204 sends a second request message 324 to the PCRF 206 to request an increase to the allowed bandwidth of the session 1. Upon receiving the second request message 324, the PCRF node 206 initiates a step to lookup the release information corresponding to the session 1. The PCRF node 206 obtains the release information for the session 1 by retrieving the major-minor release combination stored in the first entry 232 of the session data 230, which combination in this case is "8.4". The PCRF node 206 then validates 326 the second request message 324 in accordance with the release combination under which the session was created. This validation is done by in part by checking the second request message 324 against a list of supported AVPs for the relevant release combination, which list is stored in the information of supported functions 250. In this case a third entry 256 in the supported functions 250 corresponds to the relevant major-minor release combination of 8.4. Upon successful validation 328 of the second request message 324 the PCRF node 206 processes 330 the second request message 324 and provides the DP 204 with a response message 332 confirming that the requested update to the session 1 has been made. The validation and processing of the second request message 324 being relative to the major-minor release combination may be done to the first session request 308 and future requests as well.

Figure 14:
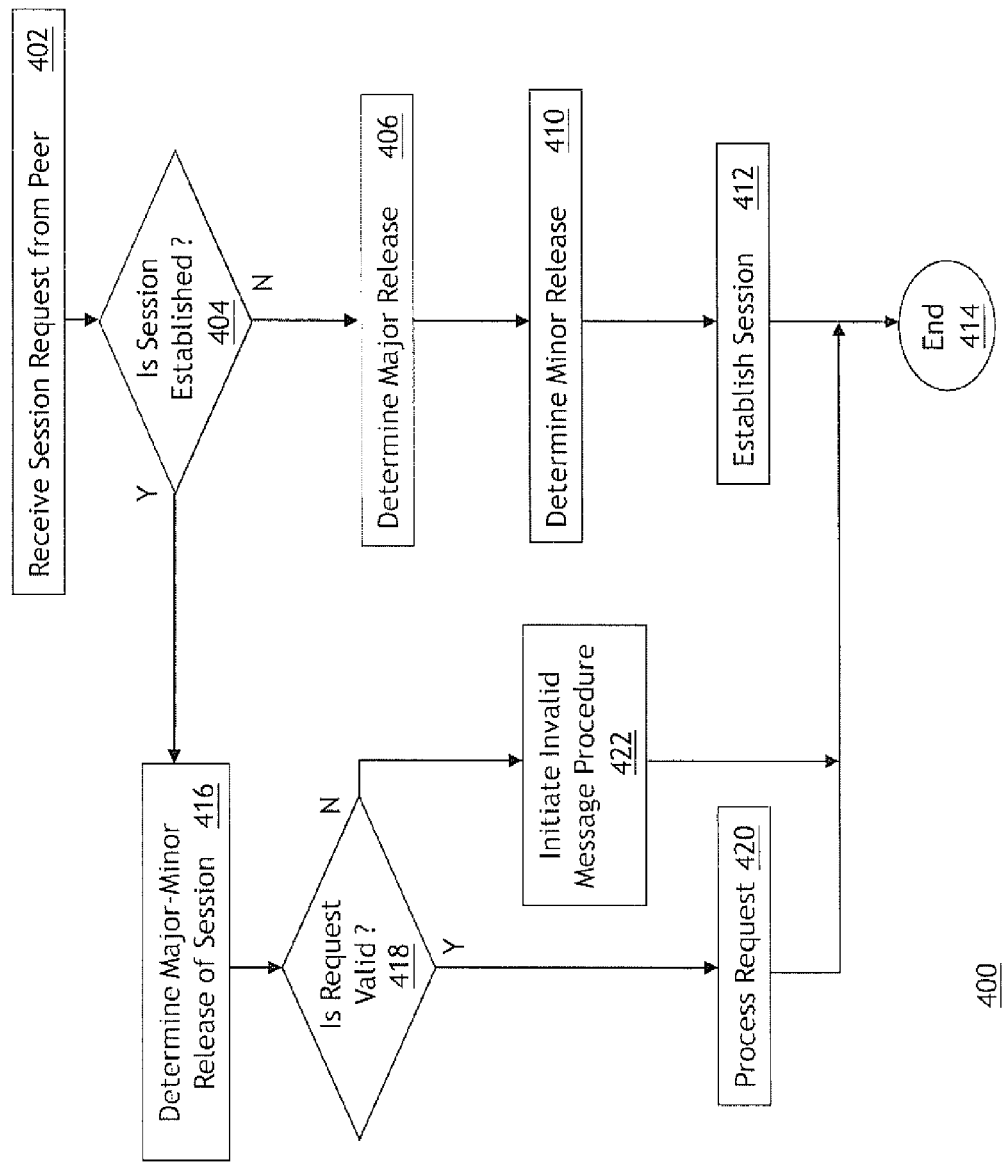
FIG. 14 depicts a method of managing sessions performed at the PCRF node in accordance with a seventh embodiment of the invention.

FIG. 14 depicts a method 400 of managing sessions performed at the PCRF node in accordance with a seventh embodiment. The method starts when a request message, also referred to simply as a request, is received 402 from a Diameter peer node, e.g. the DP 204, For example the request could any of the request messages 308 and 324 shown in FIG. 13. The PCRF node 206 then determines 404 if an established session is related to the request, e.g. by consulting the session data 230. Responsive to determining 404 that there is no established session related to the request, the PCRF node 206 determines 406 a major release associated with the request by inspecting the Feature List of the first AVP 307 as previously described with respect to FIG. 13. The PCRF node 206 then determines 410 the minor release either from the Feature List of the second AVP 309, as described earlier with respect to FIG. 13, or in the case that a second AVP as described is not included in the request, from the peer configuration data 236 or network configuration data 244 as will be described later with reference to FIGS. 15 and 16. The PCRF node 206 then establishes 412 a new session in accordance with the request and execution of the method 400 ends 414. Establishing 412 the new session may include updating the session data 230 and sending a response message, e.g. response messages 318 to the Diameter peer.

If the PCRF node 206 determines 404 that there is an established session related to the request, then the PCRF node 206 determines 416 the major-minor release combination corresponding to that session, e.g. by consulting the session data 230. The PCRF node 206 then determines 418 if the request is valid, which determination may include comparing content of the request to the information of supported functions 250 for the major-minor release combination corresponding to that session. For example, the request might include an AVP that does not appear in the supported functions for the corresponding major-minor release combination, in which case the PCRF node 206 would determine 418 that the request is not valid. Responsive to determining 418 that the request is invalid, the PCRF node 206 initiates an invalid message procedure 422, which among other things could result in the PCRF node 206 sending a response message to the Diameter peer indicating that the request was rejected or failed. After executing, or at least initiating, the invalid message procedure 422 the method 400 ends 414.

If the PCRF node 206 determines 418 that the request is valid, then the PCRF node 206 processes 420 the request and the method 400 ends 414. Processing 420 the request may include updating the session data 230 and sending a response message, e.g. response messages 332, to the Diameter peer.

Figure 15:
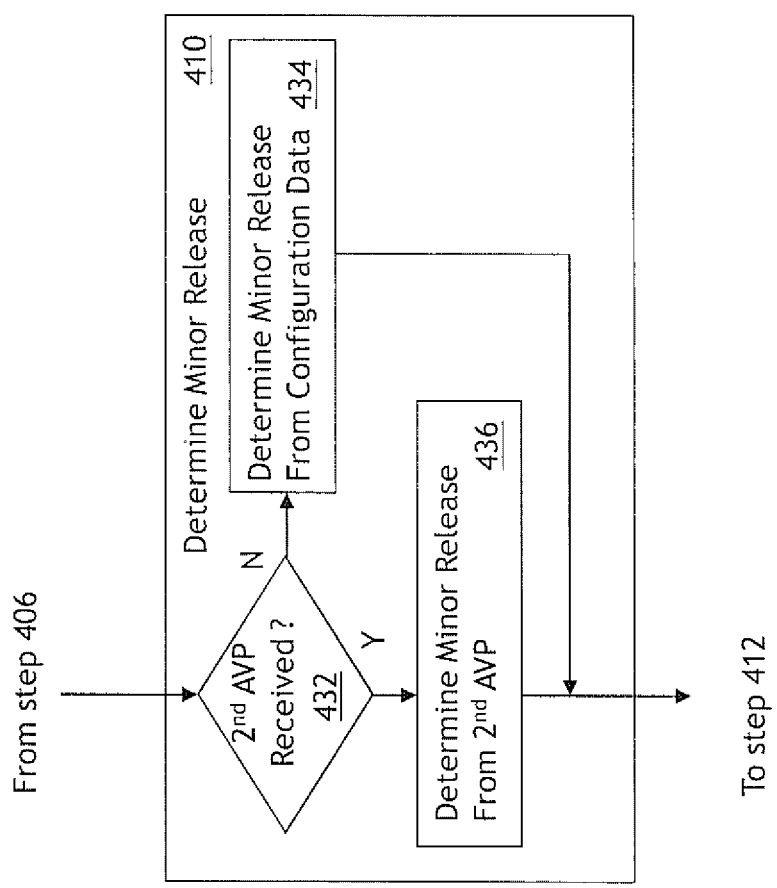
FIG. 15 depicts a step in the method of FIG. 14 in greater detail.

FIG. 15 depicts a step in the method of FIG. 14 in greater detail. The step of determining 410 the minor release starts by checking 432 if the second AVP 309 was received. If the second AVP 309 was received within the predetermined time interval and the PCRF node 206 determines 436 the minor release from the second AVP 309, i.e. by reading the Feature List and Feature Identifier in accordance with the Vendor Identifier as previously described with reference to FIG. 13. The PCRF node 206 then continues to the step of establishing 412 the session. If the second AVP 309 was not received in the request, for example because the second AVP 309 was never included in the request by the Diameter peer then the PCRF node 206 determines 434 the minor release from the peer configuration data 236 or the network configuration data 244, as will be described in more detail with reference to FIG. 16. The PCRF node 206 then continues to the step of establishing 412 the session. The Diameter peer may not have sent the second AVP 309 for any of a number of reasons, for example because the Diameter peer does not support a method of servicing session requirements, such as the method that will be described with reference to FIG. 17, or the operation of the DP 204 described with respect to FIG. 13.

Figure 16:
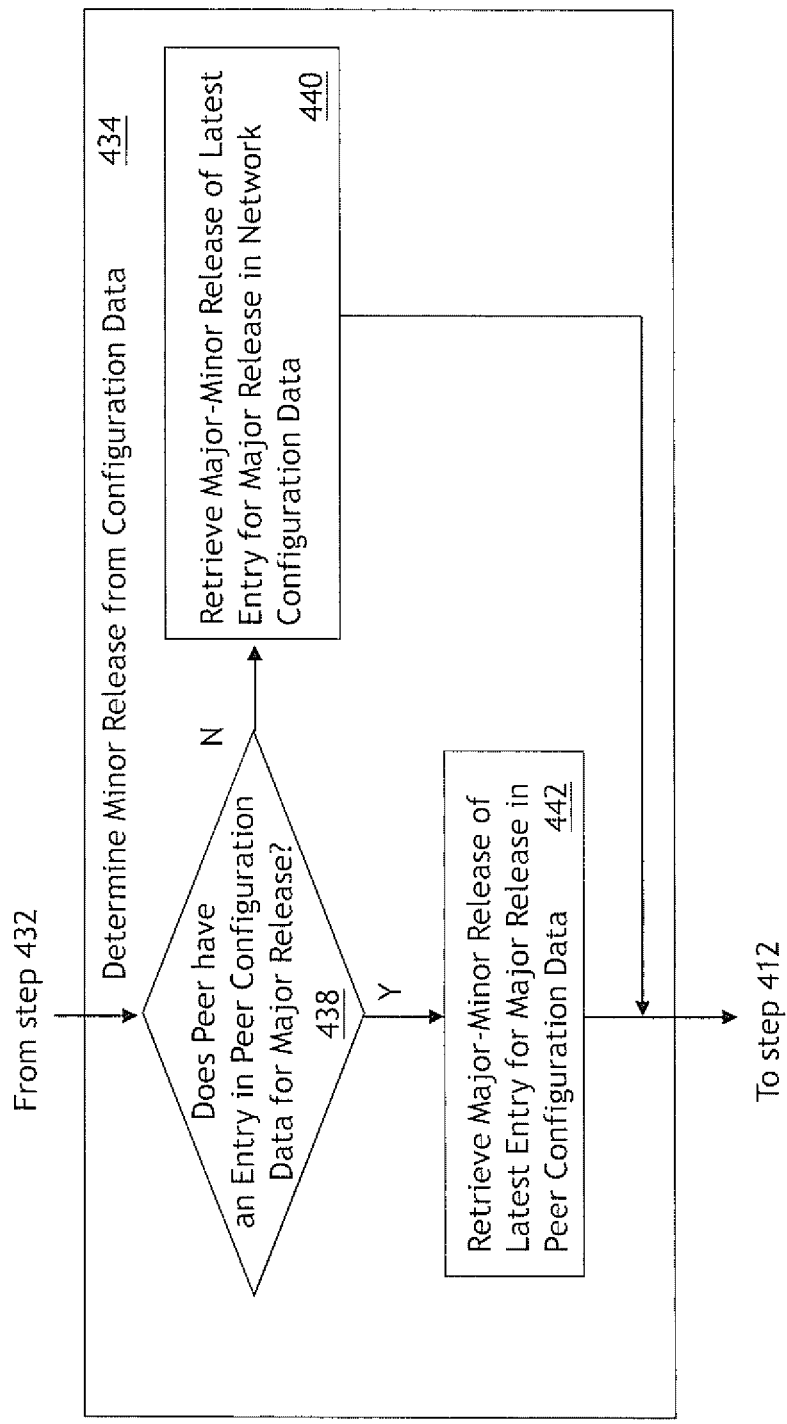
FIG. 16 depicts a step of FIG. 15 in greater detail.

FIG. 16 depicts a step of FIG. 15 in greater detail. The step of determining 434 a minor release from the configuration data, which includes the peer configuration data 236 and the network configuration data 244, is performed by determining 438 if the Diameter peer has an entry in the peer configuration data 236 for the major release specified in the first request, e.g. as specified by the feature list included in the first request. To make this determination 438 the PCRF node 206 looks for any entry in the peer configuration data 236 that corresponds to the realm and host name of the Diameter peer and to the major release specified in the first request. For example, the DP 204 has two entries 238 and 242 in the peer configuration data 236 that correspond to its realm and host name. i.e. "Realm1.host1" and to the major release version 8. Responsive to determining 438 that the Diameter peer does have an entry in the peer configuration data 236 corresponding to the major release, the PCRF node 206 retrieves 442 the latest such entry if there is more than one, which in the case of the aforementioned example would be the second entry 242 corresponding to the major-minor release combination "8.7". However, if the PCRF node 206 determines 438 that there is not an entry corresponding to the Diameter peer and the major release specified in the first request, then the PCRF node 206 retrieves 440 from the network configuration data 244 the latest entry of the major-minor release combination for the major release specified in the request. With respect to the aforementioned example regarding major release 8, the PCRF node 206 would retrieve 440 the second entry 248 from the network configuration data 244, which entry 248 indicates a major-minor release combination of "8.6". The PCRF node 206 then continues to the step of establishing 412 the session.

Figure 17:
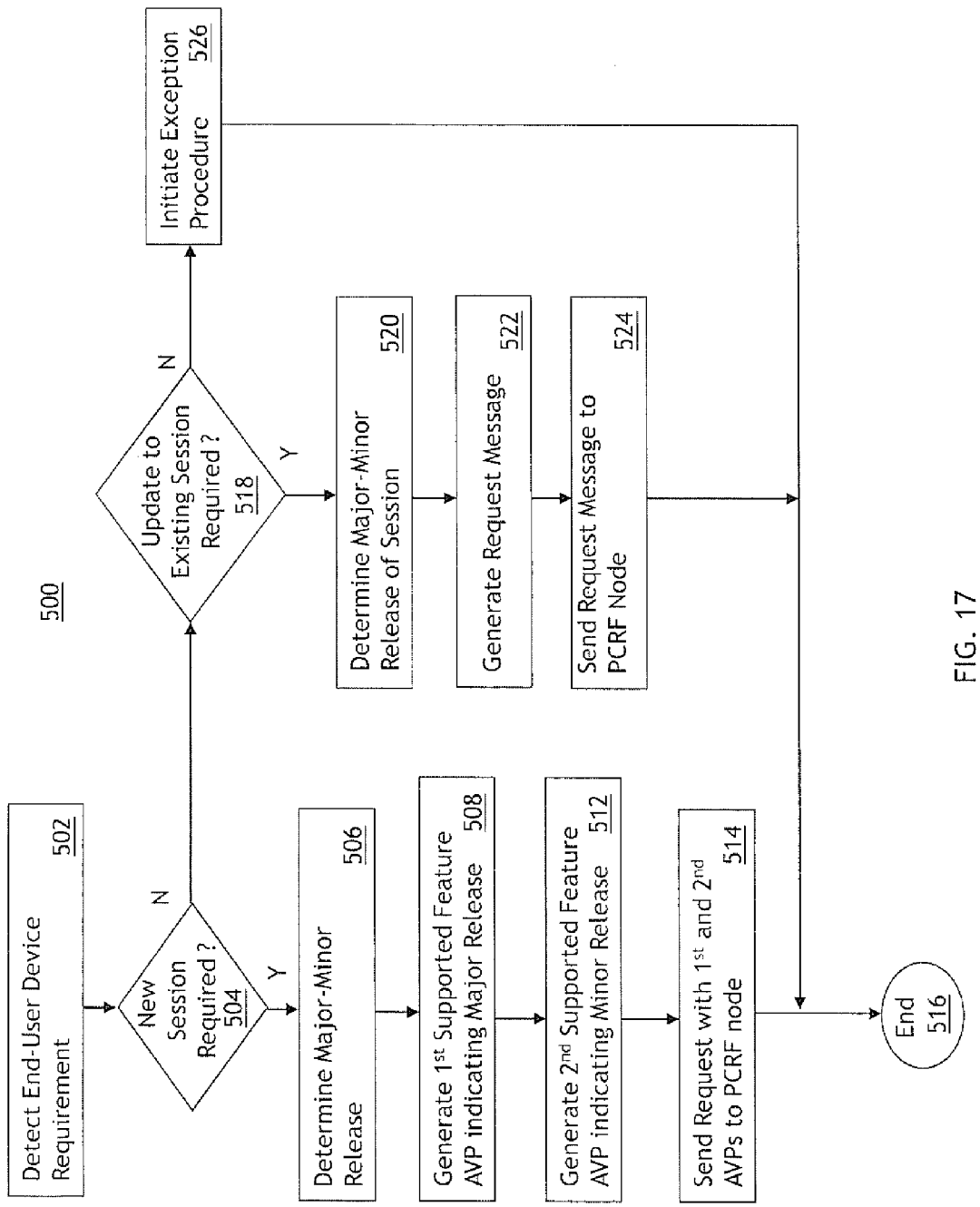
FIG. 17 depicts a method of servicing session requirements performed at an EPC node in accordance with an eighth embodiment of the invention.

FIG. 17 depicts a method 500 of servicing session requirements performed at an EPC node in accordance with an eighth embodiment. For example the EPC node could be the DP 204. The method 500 starts by detecting 502 an end-user device requirement, for example the indication 302 of a session requirement when the Device A powers up as described previously with respect to FIG. 13. The DP 204 then determines 504 if a new session is required. If a new session is not required the DP 204 determines 518 if an update to an existing session is required. If an update to an existing session is not required then the DP 204 initiates 526 an exception procedure and the method 500 ends 516.

If the DP 204 determines 518 that an update to an existing session is required then the DP determines 520 the major-minor release combination of the existing session, for example by consulting the session data 274 as previously described with respect to FIG. 12. The DP 204 then generates 522 a request message specifying the update to the session that is required. For example, the request could be the session update request 324 as described with respect to FIG. 13. The DP 204 then sends 524 the generated request message to the PCRF node 206 and the method 500 ends 516.

If the DP 204 determines 504 that a new session is required then the DP 204 determines 506 the major-minor release combination under which the session is to be established. The DP 204 could make this determination 506 in any one of several ways, for example by consulting configuration data stored on the DP 204, e.g. similar to the PCRF node's 206 peer configuration data 236 and network configuration data 244. The DP 204 may also have configuration data specific to the subscriber or application to which the indication 302 of the session requirement pertains. The DP 204 then generates 508 a first supported feature AVP indicating the major release under which the new session is to be established, for example the first AVP 307 as described with reference to FIG. 13. The DP 204 then generates 512 a second supported feature AVP indicating the minor release under which the new session is to be established, for example the second AVP 309 as described with reference to FIG. 13. The DP 204 then sends 514 a request message that includes the first and second supported feature AVPs to the PCRF node 206 and the method 500 ends 516.

It is contemplated that the methods described herein can be implemented as software, including a computer-readable medium having program instructions executing on a computer, hardware, firmware, or a combination thereof. The methods described herein also may be implemented in various combinations on hardware and/or software.

A person of skill in the art would readily recognize that steps of the various above-described methods can be performed by programmed computers and the order of the steps is not necessarily critical. Herein, some embodiments are intended to cover program storage devices, e.g., digital data storage media, which are machine or computer readable and encode machine-executable or computer executable programs of instructions where said instructions perform some or all of the steps of methods described herein. The program storage devices may be, e.g., digital memories, magnetic storage media such as magnetic disks or tapes, hard drives, or optically readable digital data storage media. The embodiments are also intended to cover computers programmed to perform said steps of methods described herein.

It will be recognized by those skilled in the art that changes or modifications may be made to the above-described embodiments without departing from the broad inventive concepts of the invention. It should therefore be understood that this invention is not limited to the particular embodiments described herein, but is of the invention as set forth in the claims.

What is claimed is:

1. A device for controlling sessions in a network comprising:
   an interface for communicating with an entity operable to send and receive messages regarding a session;
   data storage adapted to store session data related to the session and to store configuration data corresponding to the entity; and
   a controller configured to: determine, during the establishment of a new session, a major-minor release combination of a protocol version to be used in the new session from first and second attribute value pairs (AVPs) of a message received from the entity requesting establishment of the new session, and determine, during an existing session, the major-minor release combination of a protocol version to be used in the existing session from the session data responsive to receiving, from the entity, a message regarding the existing session, wherein the first and second AVPs respectively indicate a major release and a minor release corresponding to the major-minor release combination.

2. The device of claim 1 wherein the controller is further configured to determine, during the establishment of a second new session, a major-minor release of a protocol version to be used in the second new session from the configuration data and a first AVP of a message received from the entity requesting establishment of the second new session, responsive to only receiving a single AVP.

3. The device of claim 2 wherein the data storage is further adapted to store network configuration data, and the controller is further operable to determine from the network configuration data, in the absence of configuration data corresponding to the entity, the major-minor release combination under which the new session is to be established.

4. The device of claim 1 wherein the data storage is further adapted to store information corresponding to functions supported by the device for a given major-minor release combination, and the controller is operable to validate, in dependence upon said information, the message regarding the existing session.

5. The device of claim 4 wherein the information corresponding to functions is a list of attribute value pairs (AVPs).

6. The device of claim 1 wherein the device is implemented as a policy and charging rules function (PCRF) node.

7. The device of claim 1 wherein the device is implemented as a circuit card for installation in a network node.

8. The device of claim 1 wherein the entity is a Diameter peer node and the interface is any one of a Gx interface, Rx interface, or Gxx interface for exchanging Diameter messages.

9. A method of controlling sessions performed by a device comprising the steps of:
   receiving a first attribute value pair (AVP) in a request from a node;
   determining if there is an established session corresponding to the request; and
   performing the following steps responsive to there not being an established session:
      determining a major release identifier corresponding to a major protocol release version associated with the first AVP based on a requirement indicated by the first AVP;

determining that a second AVP was received in the request;

determining, responsive to receiving the second AVP, a minor release identifier corresponding to a minor protocol release version associated with the second AVP based on a requirement indicated by the second AVP; and establishing a session in accordance with the protocol version corresponding to the major and minor release identifiers.

10. The method of claim 9 further comprising:

responsive to there not being an established session:

determining, responsive to not receiving the second AVP, the minor release identifier from configuration data.

11. The method of claim 10 wherein determining the minor release identifier from configuration data comprises:

determining if there is an entry of peer configuration data corresponding to the node and the major release identifier;

retrieving, responsive to there being said entry, a minor release identifier from said entry; and retrieving, responsive to there not being said entry, a minor release identifier from an entry of network configuration data.

12. The method of claim 10 wherein the method is performed by a policy and charging rules function (PCRF) node and the configuration data resides in the PCRF node.

13. The method of claim 9 wherein determining the minor release identifier associated with the second AVP comprises:

determining the minor release identifier from a vendor identifier, a feature identifier, and a feature list included in the second AVP.

14. The method of claim 9 further comprising:

performing the following steps responsive to there being an established session:

determining a major release identifier and a minor release identifier associated with the established session;

determining if the request is valid;

executing an invalid message procedure responsive to the request not being valid; and processing the request responsive to the request being valid.

15. The method of claim 14 wherein determining if the request is valid comprises comparing an attribute value pair of the request with an indication of attribute value pairs supported by a major-minor release combination corresponding to the major release identifier and the minor release identifier associated with the established session.

16. The method of claim 15 wherein the method is performed by a policy and charging rules function (PCRF) node and the indication of attribute value pairs resides in the PCRF node.

17. The method of claim 9 wherein the method is performed by a policy and charging rules function (PCRF) node.

18. The method of claim 9 wherein the request is formed as a Diameter protocol message.

19. A method of servicing session requirements of an end-user device, the method performed by a first network device and comprising the steps of:

determining if a new session is required for the end-user device; and performing the following steps responsive to the new session being required:

determining a major-minor release combination under which the new session is to be established;

generating a first attribute value pair (AVP) for the new session that indicates a major release corresponding to the major-minor release combination;

generating a second AVP for the new session that indicates a minor release corresponding to the major-minor release combination; and sending a session request that includes the first and second AVPs to a second network device.

20. The method of claim 19 further comprising:

performing the following steps responsive to the new session not being required:

determining if an update to an existing session is required; and performing the following steps responsive to an update to an existing session being required:

determining a major-minor release combination of the existing session;

generating a session update request corresponding to the major-minor release combination of the existing session; and sending the session update request to the second network device.

21. The method of claim 20 further comprising:

initiating an exception procedure responsive to the new session not being required and to the update to an existing session not being required.

22. The method of claim 19 wherein the method is performed by a Diameter peer node in a long term evolution (LTE) network.

23. The method of claim 19 wherein generating the second AVP comprises:

setting a feature identifier in the second AVP to a value meaning that a feature list in the second AVP will indicate the minor release; and setting the feature list to indicate the minor release.

24. A network device for servicing session requirements of an end-user device comprising:

an interface for communicating with a network node operable to send and receive messages regarding a session;

data storage adapted to store session data related to the session; and a controller operable to: determine that a new session is required for the end-user device, determine a major-minor release combination under which the new session is to be established, generate a session request that includes first and second attribute value pairs (AVPs) indicating respectively a major and minor release corresponding to the major-minor release combination, and send the session request to the network node.

25. The network device of claim 24 wherein the controller is further operable to:

determine that an update to an existing session is required, determine a major-minor release combination of the existing session, generate a session update request corresponding to the major-minor release combination of the existing session, and send the session update request to the network node.

26. The network device of claim 24 wherein the network node is a policy and charging rules function (PCRF) node.

27. The network device of claim 24 wherein the network device is implemented as a circuit card for installation in a Diameter peer node and the interface is any one of a Gx interface, an Rx interface, or a Gxx interface for exchanging Diameter protocol messages.

* * * * *